(12) United States Patent
Rhyne et al.

(10) Patent No.: US 9,195,018 B2
(45) Date of Patent: *Nov. 24, 2015

(54) CABLE WITH FEATURES FOR DISTINGUISHING BETWEEN FIBER GROUPS

(71) Applicant: CORNING CABLE SYSTEMS LLC, Hickory, NC (US)

(72) Inventors: Todd Ray Rhyne, Hickory, NC (US); Jimmy Ray Spurlin, Jr., Hickory, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 413 days.

This patent is subject to a terminal disclaimer.

(21) Appl. No.: 13/630,464

(22) Filed: Sep. 28, 2012

(65) Prior Publication Data

US 2014/0093216 A1   Apr. 3, 2014

Related U.S. Application Data

(63) Continuation of application No. 12/787,597, filed on May 26, 2010, now Pat. No. 8,290,321.

(60) Provisional application No. 61/219,929, filed on Jun. 24, 2009.

(51) Int. Cl.
*G02B 6/44* (2006.01)

(52) U.S. Cl.
CPC .............. *G02B 6/441* (2013.01); *G02B 6/4482* (2013.01)

(58) Field of Classification Search
None
See application file for complete search history.

(56) References Cited

U.S. PATENT DOCUMENTS

| 5,751,879 | A * | 5/1998 | Graham et al. | 385/103 |
| 6,321,012 | B1 | 11/2001 | Shen | 385/106 |
| 7,242,830 | B2 | 7/2007 | Storaasli et al. | 385/100 |
| 7,269,318 | B2 | 9/2007 | Cook | 385/100 |
| 8,290,321 | B2 * | 10/2012 | Rhyne et al. | 385/110 |
| 2006/0072886 | A1 * | 4/2006 | Kim et al. | 385/115 |
| 2006/0193570 | A1 | 8/2006 | Brown | 385/100 |
| 2006/0280413 | A1 | 12/2006 | Paschal et al. | 385/112 |

* cited by examiner

*Primary Examiner* — Hemang Sanghavi
(74) *Attorney, Agent, or Firm* — William D. Doyle

(57) ABSTRACT

Micromodule subunit cables are constructed to allow for ease of identification between optical fibers in differing groups of optical fibers. In one cable, a first group of fibers is located within a buffer tube core while a second group of fibers is located within the cable jacket, but outside of the core. The fibers in the first and second groups can accordingly use the same color coding sequence without requiring additional indicia such as stripes or binding.

20 Claims, 3 Drawing Sheets

CABLE WITH FEATURES FOR DISTINGUISHING BETWEEN FIBER GROUPS

PRIORITY APPLICATION

This application is a continuation of U.S. application Ser. No. 12/787,597 filed May 26, 2010, which claims priority to U.S. application Ser. No. 61/219,929, filed Jun. 24, 2009, the entire contents of each of which are hereby incorporated by reference herein.

TECHNICAL FIELD

The present disclosure relates to optical cables with features that provide easy access to and segregation between optical fibers in different groups of optical fibers.

BACKGROUND

Data centers require high density for optical components to compensate for limited space. MTP connectors are used in data centers because they allow for high density, as well as high efficiency. 24 fiber MTP connectors, for example, provide for high density optical connectivity. Typical MTP connectors are designed for a cable of circular profile and an outer diameter of 3.3 mm or less.

During cable access and connectorization of 24f cables, the installer must be able to distinguish fibers 1-12 in the first group of fibers from fibers 13-24 in the second group. There are, however, only twelve colors used in the industry standard color coding scheme. One method to distinguish the two groups fibers is to provide fibers 13-24 with marking indicia, such as dashed lines, to distinguish them from fibers 1-12. Fiber coloring inks are applied and cured at extremely high speeds, however, and applying dashes or other indicia slows production line speed as well as increasing costs of manufacture.

Another method of distinguishing between fiber groups is to bundle fibers 13-24 in the second group with a thread binder that is wrapped around the bundle of fibers. The binder can untwist, however, when the installer removes the outer jacket of the cable. When the binder untwists, the installer loses traceability between the two groups of 12 colored fibers.

Conventional cables may also be difficult to connect to MTP connectors, or have bend characteristics that render the cables difficult to route through data center space.

SUMMARY

According to a first embodiment, a cable comprises a cable jacket, a core located within the cable jacket and including a core tube with a first group of optical fibers located therein, and a second group of fibers located outside of the core tube. The first group of fibers are readily distinguishable from the second group by their inclusion within the core tube so that traceability is retained during accessing of the cable.

According to one aspect of the first embodiment, the cable may have non-preferential bend characteristics and may be easily connectorized.

According to another aspect of the first embodiment, a plurality of the cables may be incorporated into a micromodule cable. The cables may be sufficiently robust so as to be suitable as furcation legs.

It is to be understood that both the foregoing general description and the following detailed description present embodiments of the invention, and are intended to provide an overview or framework for understanding the nature and character of the invention as it is claimed.

BRIEF DESCRIPTION OF THE FIGURES

The present embodiments are explained in more detail below with reference to figures which show the exemplary embodiments.

DETAILED DESCRIPTION

Figure 1:
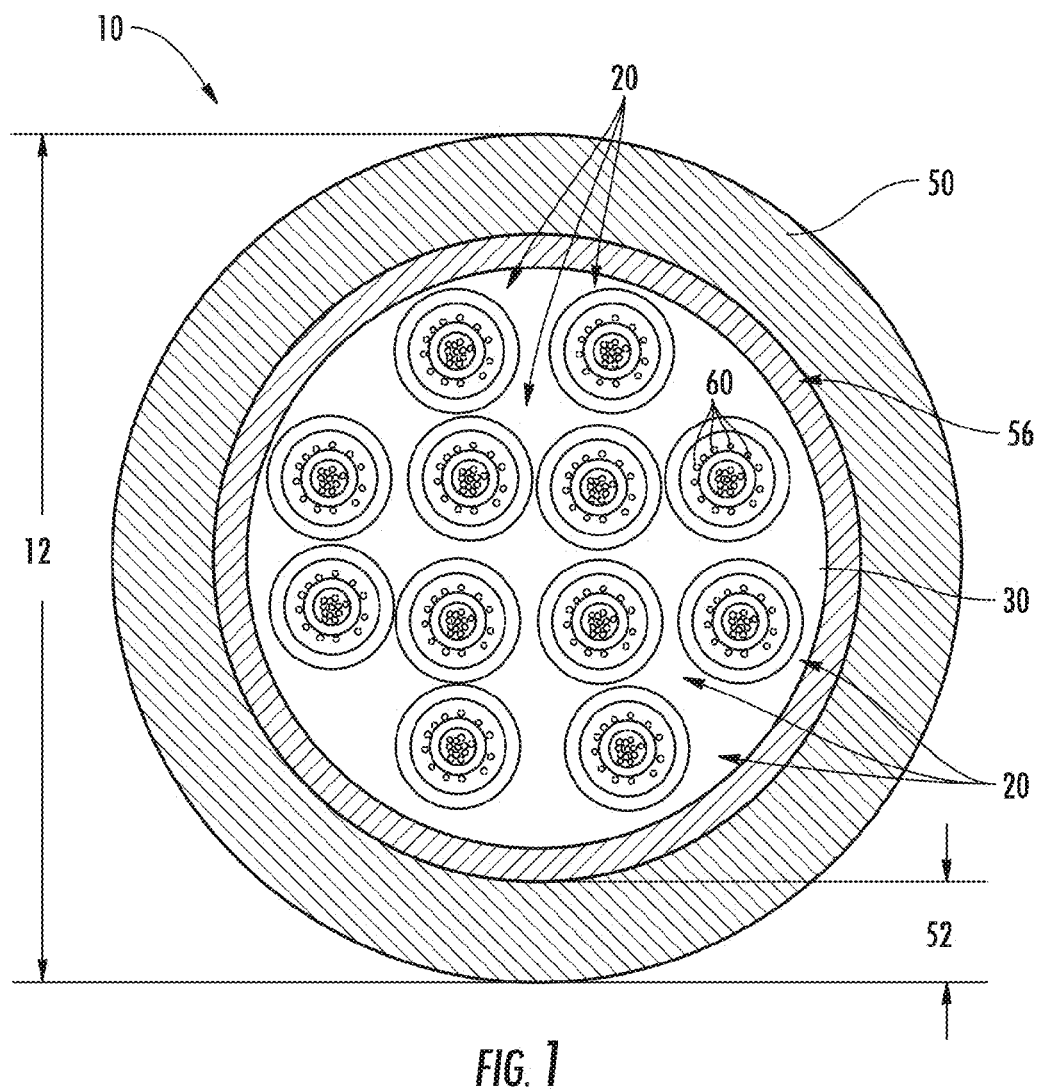
FIG. 1 is a cross section of a micromodule cable according to a first embodiment.

FIG. 1 is a cross section of a micromodule cable 10 according to a first embodiment and having an outside diameter 12. The micromodule cable 10 comprises a plurality of micromodule subunit cables 20 disposed in an interior 30 of the micromodule cable 10. The interior 30 of the cable 10 is defined by the cable's outer jacket 50. The outer jacket 50 can be formed from, for example, a flame-retardant polymer material, and has a thickness 52. A strain-relief component 56 may be disposed adjacent to the interior of the jacket 50 and surrounding and/or interspersed among the micromodule cable subunits 20. The strain-relief component 56 may be, for example, a layer of longitudinally-extending yarns for absorbing tensile loads on the cable 10. Each micromodule subunit cable, or simply "micromodule," 20, includes a plurality of optical fiber waveguides 60. The exemplary micromodules 20 are not stranded within the cable 10, although stranding may be used for certain applications. For example, the micromodules 20 can be twisted in helical fashion with respect to one another, in particular when a plurality of or all of the micromodules 20 are arranged in such a way that they are rotated with a specified lay length.

In the illustrated embodiment, the micromodule cable 10 has twelve micromodule subunit cables 20, with each micromodule 20 including 24 optical fiber waveguides 60. Other numbers of micromodule subunits 20 and optical fibers 60 can be employed for various applications, however. The micromodule cable 10 and the micromodule subunit cables 20 all have generally circular cross-sections, although other cross-sections, such as oval or elliptical, may be used. The diameters of the various circular cross-sections are described to in this specification. It is understood that the illustrated cables and subunits will not have perfectly circular cross sections, and that any citations of diameters may represent an average diameter of a generally circular cross section.

Figure 2:
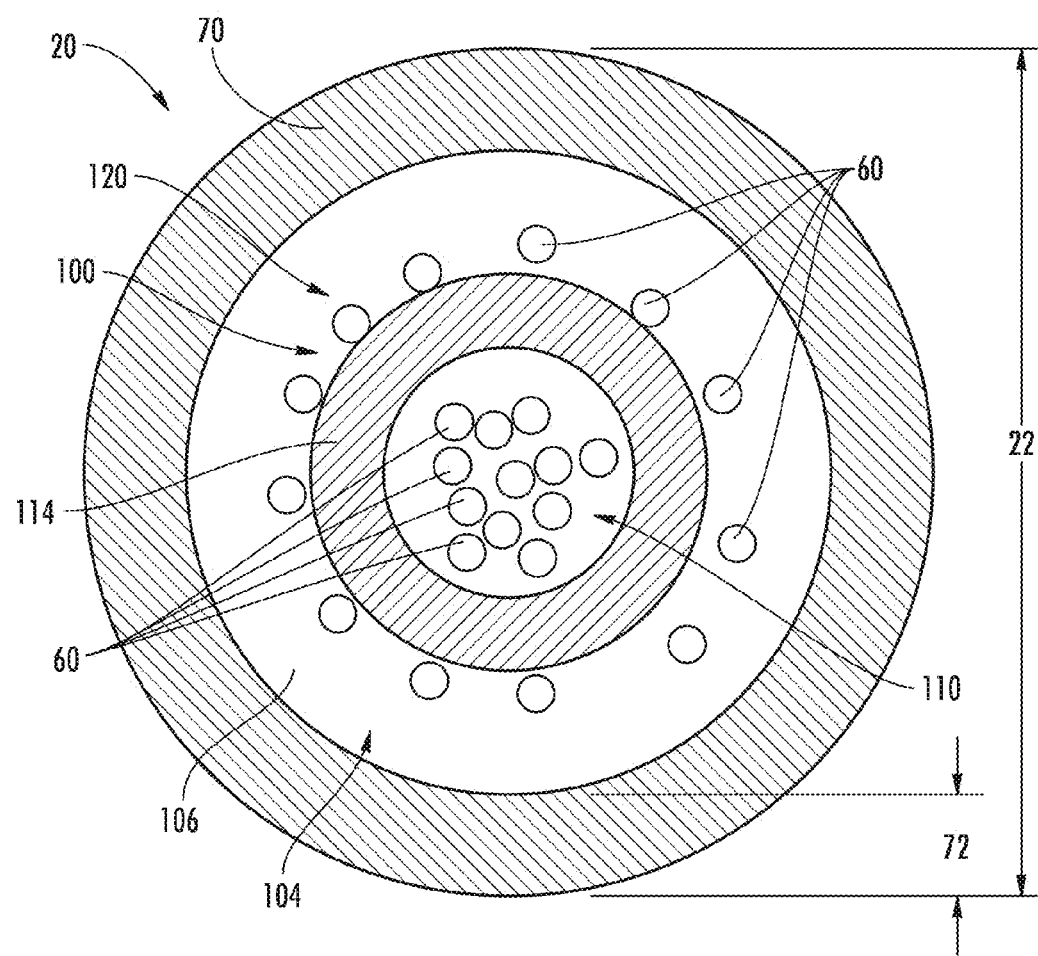
FIG. 2 is a sectional view of one of the micromodule subunit cables used in the cable of FIG. 1.

FIG. 2 is a cross section of one of the exemplary micromodule subunit cables 20 illustrated in FIG. 1 having a diameter 22. Each micromodule subunit 20 has a cable jacket 70 of thickness 72 that encloses a core 100. A strain-relief component 104 may be disposed within an interior 106 of the cable jacket 70 and surrounding the core 100. The strain-relief component 104 may be, for example, a layer of longitudinally-extending yarn strands that extend along the length of the micromodule subunit cable 20 for absorbing tensile loads on the cable. The exemplary strain-relief component 104 essentially comprises a dispersed layer of aramid strands in the region between the jacket 70 and the core 100, and is not illustrated schematically in FIG. 2. Instead, the general location of the strain-relief component 104 is indicated.

According to one aspect of the first embodiment, the optical fibers 60 are arranged in a first group 110 that are located within a core tube 114 of the core 100, and in a second group 120 that is located outside of the core 100. The optical fibers 60 within the first group 110, which are enclosed within the core tube 114, are accordingly segregated and easily distinguishable from those in the second group 120. The feature ensures that the installer retains traceability between the two groups of 12 colored fibers.

According to the disclosed embodiment, each of the optical fibers 60 in the first group 110 may have a corresponding optical fiber 60 in the second group 120 that is identical in appearance and/or color. The terms "identical" or "the same" allow for minor manufacturing variations among the similarly-colored fibers. In the context of this specification, a statement that one fiber has the same color and appearance as another fiber means that neither fiber of a certain color in one group has or requires additional identifying indicia (e.g. stripes) applied to distinguish it from the same colored fiber in another group. There is no need to provide identifying indicia on the optical fibers 60 of either of the groups 110, 120 in order to distinguish between the groups because the first group 110 is enclosed within the core tube 114. Also according to the disclosed embodiment, there is no need to enclose one fiber group in a thread binder, or to enclose both groups of fibers within separate, individually marked buffer tubes, in order to distinguish between the fibers of each group.

In one embodiment, the first group 110 includes twelve optical fibers 60 in a 12 color sequence of blue, orange, green, brown, slate, white, red, black, yellow, purple, rose, and aqua. The second group 120 also includes twelve optical fibers in a 12 color sequence of blue, orange, green, brown, slate, white, red, black, yellow, purple, rose, and aqua. The fibers 60 of the first group 110 are therefore identical in appearance to the fibers in the second group 120. The technician accessing the fibers 60 within the cable 10 can nonetheless quickly and easily distinguish the fibers 60 in the two groups because the first group 110 is located within the core tube 114, which segregates the groups 110, 120 during access and connectorization.

The optical fibers 60 in the second group 120 can be arranged in the jacket interior 106 around the core 100 and may be in contact with the strands of the strain-relief component 104. For example, the second group 120 of fibers can be arranged around the core 100, with the strain-relief component 104 helically wrapped around the fiber in the second group 120 and the core 100. One or more of the optical fibers 60 in the second group 120 are in at least intermittent contact with the exterior of the core tube 114.

The diameters and thicknesses of the micromodule subunit cable 20 and of the core tube 114 can vary according to the number of optical fibers 60 enclosed therein, and according to other factors. According to one aspect of the present embodiments, the diameter 22 can be in the range of 2.0 mm to 5.0 mm. According to another aspect of the present embodiments, the diameter 22 can be in the range of 3.0 mm to 4.0 mm, and more particularly 3.5 mm or less. If the cable 20 is to be used to connect to certain MTP connectors, the diameter can be 3.3 mm or less. According to another aspect of the present embodiments, the thickness 72 of the cable jacket 70 can be in the range of 0.2 mm to 1.5 mm. According to one aspect of the present embodiments, the diameter of the core tube 114 can be in the range of 0.9 mm to 3.0 mm According to another aspect of the present embodiments, the diameter of the core tube 114 can be in the range of 1.5 mm to 2.5 mm. According to another aspect of the present embodiments, the thickness of the core tube 114 can be in the range of 0.1 mm to 0.95 mm.

EXAMPLE 1

A micromodule subunit cable 20 as shown in FIG. 2 includes a first group 110 of twelve optical fiber waveguides 60 and a second group 120 of twelve optical fiber waveguides 60. Each group 110, 120 includes fibers coded in the 12-color sequence: blue, orange, green, brown, slate, white, red, black, yellow, purple, rose, and aqua. For each fiber 60 in the first group 110, there is a corresponding fiber 60 in the second group 120 of identical appearance, including color or external pattern or identifying indicia, if any. In this example, the fibers in both groups are of solid color with no identifying indicia. The cable diameter 22 is about 3.3 mm, and the thickness 72 of the jacket 70 is about 0.4 mm The diameter of the core 100 buffer tube 114 is about 1.6 mm, and the thickness of the core tube 114 is about 0.2 mm. The fibers 60 are bare, non-tight buffered fibers of about 0.250 mm diameter and are sold as ClearCurve® multimode fiber available from Corning Incorporated. The jacket 70 is made from a flame-retardant PVC sold under the compound number 910A-18 available from Teknor Apex Co. The core tube 114 is made from a flame-retardant PVC sold under the compound name Smokeguard™ 1070L available from AlphaGary Corporation. The strain-relief component 104 comprises KEVLAR® aramid tensile yarns disposed around the core 100. From 2-8 strands of tensile yarn are used. The subunit cable is connectorized to MTP connectors.

The present cable embodiments may utilize tensile yarns as tension relief elements that provide tensile strength to the cables. A preferred material for the tensile yarns is aramid (e.g., KEVLAR®), but other tensile strength materials could be used. For example, high molecular weight polyethylenes such as SPECTRA® fiber and DYNEEMA® fiber, Teijin Twaron® aramids, fiberglass, etc. may also be used. The yarns may be stranded to improve cable performance.

The components of the cable 10, such as the micromodule cables 20, can be constructed of selected materials of selected thicknesses such that the cable 10 achieves plenum burn ratings according to desired specifications. The micromodule subunit cables 20 can also be constructed so that they are relatively robust, such that they are suitable for field use, while also providing a desired degree of accessibility. For example, the micromodule cables 20 according to the present embodiment can be constructed with thicker cable jackets 70 which provide sufficient protection for the fibers such that the micromodules 20 may be used as furcation legs.

The outer jacket 50, the micromodule subunit jackets 70, and the core tubes 114 can be formed from fire-retardant materials to obtain a desired plenum burn rating. For example, highly-filled PVCs of a specified thicknesses can be used to form these components. Other suitable materials include low smoke zero halogen (LSZH) materials such as flame retardant polyethylene and PVDF. One plenum burn standard is the National Fire Protection Standards (NFPA) 262 burn test. NFPA 262 prescribes the methodology to measure flame travel distance and optical density of smoke for insulated, jacketed, or both, electrical wires and cables and optical fiber cables that are to be installed in plenums and other spaces used to transport environmental air without being enclosed in raceways. Cables according to the present embodiments may also be constructed to be low skew within the micromodules 20 so that they are suitable for use in parallel optic transmission systems.

In one particular set of parameters, cables according to the present embodiments may contain from four to twelve optical fibers within each micromodule 20. The dimensions of the micromodules 20 may be adjusted based on the number of fibers within the module. The fibers 60 may be loosely disposed within the micromodules 20 in an essentially parallel array. The fibers 60 may be coated with a thin film of powder, such as chalk or talc, which forms a separation layer that prevents the fibers from sticking to the molten sheath material during extrusion. The cable 10 may be further encased in an interlocking armor for enhanced crush resistance.

The core 100 is illustrated as generally disposed in the center of the cable jacket 70, with the optical fibers 60 of the second group of fibers 120 disposed around the periphery of the core tube 114. The location of the strain-relief component 104, the optical fibers 60, and the core 100 may vary, however, within the cable jacket 70 along the length of the jacket. The core tube 114 may, for example, contact the interior surface of the jacket 70 at one or more locations. One or more of the optical fibers 60 in the second group 120 may also contact the exterior surface of the core tube 114 and/or the interior surface of the jacket 70 at one or more locations along the length of the cable 20.

The cable can be manufactured by first producing a core 100. The core 100 can be manufactured by providing optical fibers 60 that will comprise the first group of optical fibers 110 and extruding the core tube 114 about the first group of fibers 110. The core 100 is then provided along with the optical fibers 60 of the second group 120. The cable jacket 70 is extruded over the fibers of the second group 120 and the core 100. If present, the aramid fibers of the strength component 104 are also provided within the cable jacket 70 during extrusion of the cable jacket.

Figure 3:
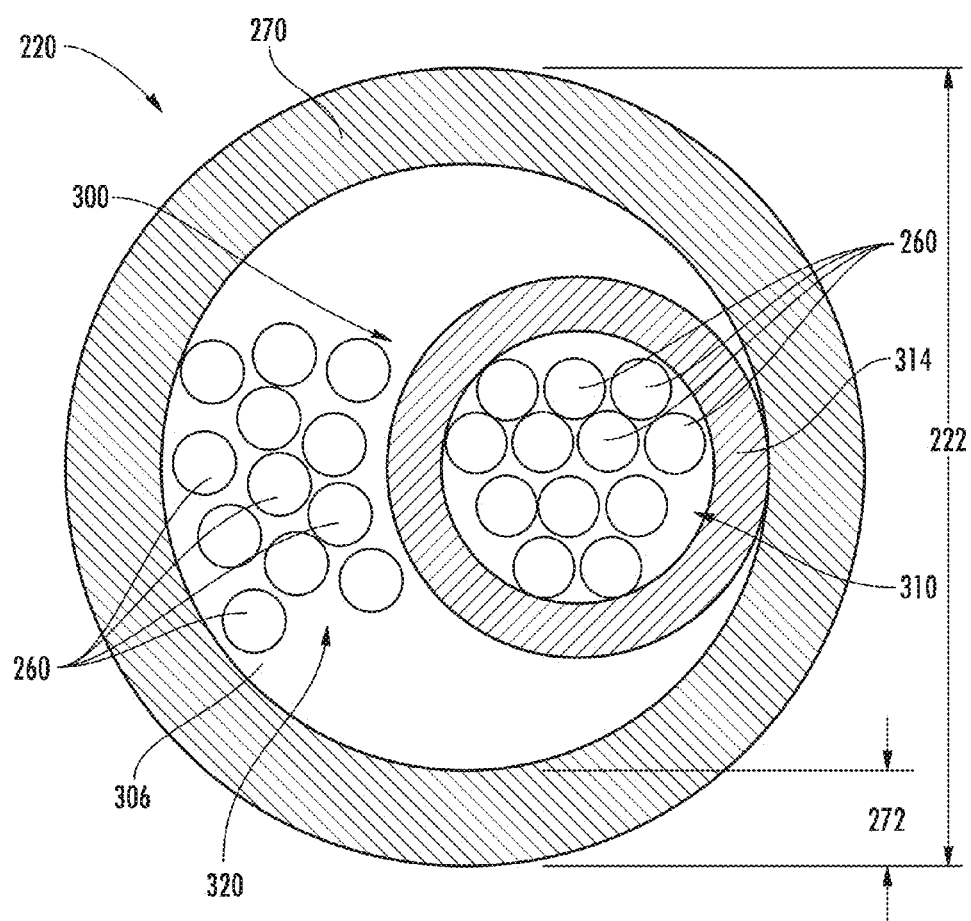
FIG. 3 is a sectional view of a micromodule subunit cable according to a second embodiment.

FIG. 3 is a cross section a micromodule subunit cable 220 according to a second embodiment and having a diameter 222. The micromodule subunit 220 has a cable jacket 270 of thickness 272 that encloses a core 300. A strain-relief component (not illustrated) may be disposed within an interior 306 of the cable jacket 270 and surrounding the core 300. The cable 220 may be similar in method of construction, materials of construction, and dimensions as the cable 20 illustrated in FIG. 2.

As in the embodiment shown in FIG. 2, the optical fibers 260 are arranged in a first group 310 that are located within a core tube 314 of the core 300, and in a second group 320 that is located outside of the core 300. The optical fibers 260 within the first group 310, which are enclosed within the core tube 314, are segregated and easily distinguishable from those in the second group 320. In this exemplary embodiment, the core 300 is disposed on one side of the interior 306, and the second group of fibers 320 is disposed on the other side.

According to one aspect of the present embodiments, the cables may have nonpreferential bend characteristics, of relatively small diameter, and utilize non-tight buffered fiber groupings. These features allow the cables to be easily attached to MTP connectors, and also allow for easy routing of the fibers once in the MTP body.

Many modifications and other embodiments of the present invention, within the scope of the claims will be apparent to those skilled in the art. For instance, the concepts of the present invention can be used with any suitable fiber optic cable design and/or method of manufacture. For instance, the embodiments shown can include other suitable cable components such as an armor layer, coupling elements, different cross-sectional shapes, or the like. Thus, it is intended that this invention covers these modifications and embodiments as well those also apparent to those skilled in the art.

What is claimed is:

1. A cable, comprising:
   a cable jacket;
   a core located within the cable jacket, the core comprising:
      a core tube; and
      a first group of optical fibers disposed within the core tube; and
      a second group of optical fibers disposed within the cable jacket and outside of the core tube; and
   a strain-relief component disposed within the cable jacket and outside of the core tube; wherein the strain-relief component comprises a plurality of longitudinally extending tensile yarns; and
   wherein a diameter of the cable is 3.3 mm or less.

2. The cable of claim 1, wherein for each optical fiber in the first group, the corresponding optical fiber in the second group has the same color and appearance thereof.

3. The cable of claim 1, wherein at least one of the optical fibers of the second group contacts an outer surface of the core at at least one location.

4. The cable of claim 1, wherein at least one of the optical fibers of the second group contacts an inner surface of the cable jacket at at least one location.

5. The cable of claim 1, wherein the first group of optical fibers comprises twelve optical fibers and the second group of optical fibers comprises twelve optical fibers.

6. The cable of claim 5, wherein the twelve optical fibers in the first and second groups have exterior coloring in the color sequence of blue, orange, green, brown, slate, white, red, black, yellow, purple, rose, and aqua.

7. The cable of claim 1, wherein the tensile yarns contact the core tube and the cable jacket.

8. The cable of claim 1, wherein the cable jacket comprises a PVC and the core tube comprises a PVC.

9. A cable, comprising:
   a cable jacket;
   a core located within the cable jacket, the core comprising:
      a core tube; and
      a first group of optical fibers disposed within the core tube; and
      a second group of optical fibers disposed within the cable jacket and outside of the core tube; and
   a strain-relief component disposed within the cable jacket and outside of the core tube; wherein the strain-relief component comprises a plurality of longitudinally extending tensile yarns; and
   wherein a diameter of the cable is in the range of 2.0 mm to 5.0 mm.

10. The cable of claim 9, wherein for each optical fiber in the first group, the corresponding optical fiber in the second group has the same color and appearance thereof.

11. The cable of claim 9, wherein at least one of the optical fibers of the second group contacts an outer surface of the core at at least one location.

12. The cable of claim 9, wherein at least one of the optical fibers of the second group contacts an inner surface of the cable jacket at at least one location.

13. The cable of claim 9, wherein the first group of optical fibers comprises twelve optical fibers and the second group of optical fibers comprises twelve optical fibers.

14. The cable of claim 9, wherein the tensile yarns contact the core tube and the cable jacket.

15. The cable of claim 9, wherein the cable jacket comprises a PVC and the core tube comprises a PVC.

16. A cable, comprising:
   a cable jacket;
   a core located within the cable jacket, the core comprising:
      a core tube; and
      a first group of optical fibers disposed within the core tube; and a second group of optical fibers disposed within the cable jacket and outside of the core tube,
wherein a thickness of the cable jacket is in the range of 0.2 mm to 1.5 mm, a diameter of the core tube is in the range of 0.9 mm to 3.0 mm, and a thickness of the core tube is in the range of 0.1 mm to 0.95 mm.

17. The cable of claim 16, further comprising an aramid strain-relief component disposed within the cable jacket and outside of the core tube.

18. The cable of claim 17, wherein at least one of the optical fibers of the second group contacts an outer surface of the core at at least one location and contacts an inner surface of the cable jacket at at least one location.

19. The cable of claim 16, wherein each optical fiber in the first group has a corresponding optical fiber in the second group of the same color and appearance.

20. The cable of claim 16, wherein the cable jacket comprises a PVC and the core tube comprises a PVC.

* * * * *